United States Patent
Guo et al.

(10) Patent No.: US 12,021,460 B2
(45) Date of Patent: Jun. 25, 2024

(54) DISPLACEMENT CORRECTION APPARATUS, MAGNETIC LEVITATION BEARING SYSTEM AND DISPLACEMENT CORRECTION METHOD THEREOF

(71) Applicant: GREE ELECTRIC APPLIANCES, INC. OF ZHUHAI, Zhuhai (CN)

(72) Inventors: Weilin Guo, Zhuhai (CN); Cong Zhao, Zhuhai (CN); Yongling He, Zhuhai (CN); Daofu Hu, Zhuhai (CN); Xue Li, Zhuhai (CN); Jiandong Sun, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 455 days.

(21) Appl. No.: 17/400,522

(22) Filed: Aug. 12, 2021

(65) Prior Publication Data

US 2021/0376775 A1   Dec. 2, 2021

Related U.S. Application Data

(63) Continuation of application No. PCT/CN2019/114741, filed on Oct. 31, 2019.

(30) Foreign Application Priority Data

Feb. 27, 2019 (CN) .................. 201910146759.3

(51) Int. Cl.
*H02N 15/00* (2006.01)
*F16C 32/04* (2006.01)
*G01B 7/14* (2006.01)

(52) U.S. Cl.
CPC ......... *H02N 15/00* (2013.01); *F16C 32/0459* (2013.01); *G01B 7/14* (2013.01)

(58) Field of Classification Search
CPC ..... H02N 15/00; F16C 32/0459; F16C 32/04; F16C 32/0455; F16C 32/0451; F16C 41/00; G01B 7/14; G01B 7/144; G01D 3/02

See application file for complete search history.

(56) References Cited

U.S. PATENT DOCUMENTS

| 5,130,589 A | 7/1992 | Kanemitsu |
| 5,542,001 A | 7/1996 | Reiffin |

(Continued)

FOREIGN PATENT DOCUMENTS

| CN | 86209326 U | 12/1987 |
| CN | 2073597 U | 3/1991 |

(Continued)

OTHER PUBLICATIONS

International Search Report issued in corresponding PCT Application No. PCT/CN2019/114741, dated Feb. 12, 2020.

(Continued)

*Primary Examiner* — Bryan R Perez
(74) *Attorney, Agent, or Firm* — Westbridge IP LLC

(57) ABSTRACT

Disclosed is a displacement correction apparatus. The apparatus comprises: a reference circuit and a correction circuit; the reference circuit is configured to provide a reference signal; the correction circuit is configured to perform a logarithm operation on a nonlinear displacement signal to be corrected based on the reference signal, to obtain a corrected linear displacement signal. The displacement correction apparatus can solve the problem of poor detection accuracy resulting from a position signal output by an eddy current sensor being not in a linear relationship with a displacement signal of a shaft, thereby achieving the effect of improving detection accuracy. A magnetic levitation bearing system (Continued)

and a displacement correction method therefor which use the above displacement correction apparatus are also disclosed.

12 Claims, 4 Drawing Sheets

(56) References Cited

U.S. PATENT DOCUMENTS

| | | | |
|---|---|---|---|
| 5,736,800 | A | 4/1998 | Iannello et al. |
| 2008/0074010 | A1* | 3/2008 | Jungmayr ............ F04D 25/0653 318/632 |
| 2020/0149958 | A1* | 5/2020 | Young ................. H03M 1/1235 |

FOREIGN PATENT DOCUMENTS

| | | |
|---|---|---|
| CN | 1851398 A | 10/2006 |
| CN | 101931371 A | 12/2010 |
| CN | 102722210 A | 10/2012 |
| CN | 103939485 A | 7/2014 |
| CN | 104321616 A | 1/2015 |
| CN | 104333289 A | 2/2015 |
| CN | 104712654 A | 6/2015 |
| CN | 104737027 A | 6/2015 |
| CN | 105048913 A | 11/2015 |
| CN | 106403795 A | 2/2017 |
| CN | 106907393 A | 6/2017 |
| CN | 109654125 A | 4/2019 |
| CN | 209687938 U | 11/2019 |
| JP | S57153578 A | 9/1982 |
| JP | S6273101 A | 4/1987 |
| JP | 2009268641 A | 11/2009 |
| JP | 2012255732 A | 12/2012 |
| JP | 2013205366 A | 10/2013 |
| JP | 2016142717 A | 8/2016 |
| KR | 19990050901 A | 7/1999 |

OTHER PUBLICATIONS

Written Opinion issued in corresponding PCT Application No. PCT/CN2019/114741, dated Feb. 12, 2020.
Extended European Search Report issued in counterpart European Patent Application No. 19917275.0, dated Jun. 9, 2022.

* cited by examiner

DISPLACEMENT CORRECTION APPARATUS, MAGNETIC LEVITATION BEARING SYSTEM AND DISPLACEMENT CORRECTION METHOD THEREOF

CROSS-REFERENCE TO RELATED APPLICATIONS

This application is a Continuation Application of PCT application No. PCT/CN2019/114741, filed on Oct. 31, 2019, which claims priority to Chinese Patent Application 201910146759.3, filed on Feb. 27, 2019. All of the aforementioned applications are incorporated herein by reference in their entireties.

TECHNICAL FIELD

The disclosure relates to the technical field of magnetic levitation, in particular to a displacement correction apparatus, a magnetic levitation bearing system and a displacement correction method thereof.

BACKGROUND

In a magnetic levitation bearing system, in order to realize a stable levitation of a shaft, a precise position sensor is required to detect the position of the shaft in real time. According to the need of the magnetic levitation system, requirements on linearity and resolution of the position sensor are high. The common sensor is an eddy current displacement sensor (hereinafter called eddy current sensor for brevity).

The eddy current sensor has a high resolution but a short linear range. In the magnetic levitation bearing system, a larger sensor range is required for detecting the axial position of the shaft. When the range is satisfied, an output of the position signal of the eddy current sensor is obviously nonlinear; in other words, the signal output by the sensor is not in a linear relationship with the displacement signal, which will lead to an inaccurate position detection, thus leading to an unstable levitation and a poor levitation accuracy, and even leading to a shaft collision and a damage to the magnetic levitation system.

The above contents are described to assist in understanding the technical solution of the disclosure, and do not mean that the above contents are recognized as prior art.

SUMMARY

According to one aspect of the disclosure, a displacement correction apparatus is provided. The apparatus may include: a reference circuit, configured to provide a reference signal; and a correction circuit, configured to perform a logarithm operation on a nonlinear displacement signal to be corrected based on the reference signal, to obtain a corrected linear displacement signal.

In some embodiments, the displacement apparatus may also include: a controller, configured to determine whether the linear displacement signal meets a set threshold, and if the linear displacement signal does not meet the set threshold, output an adjustment signal to the reference circuit; the reference circuit is configured to adjust the reference signal based on the adjustment signal, to obtain an adjusted reference signal.

In some embodiments, the displacement apparatus may also include: an analog-to-digital converter, configured to perform an analog-to-digital conversion on the linear displacement signal to obtain a digital signal of the linear displacement signal, and output the digital signal of the linear displacement signal to the controller.

In some embodiments, the reference circuit may include: an adjustment resistor, a first current limiting resistor, and a comparator; an adjustment terminal of the adjustment resistor is an input terminal of the adjustment signal, the adjustment resistor is connected to a non-inverting input terminal of the comparator; and the first current limiting resistor is also connected to the non-inverting input terminal of the comparator, an inverting input terminal of the comparator is connected to an output terminal of the comparator, and the output terminal of the comparator is connected to a reference signal input terminal of the correction circuit.

In some embodiments, the adjustment terminal of the adjustment resistor is configured to receive the adjustment signal, a first connecting terminal of the adjustment resistor is electrically connected to a ground terminal, and a second connecting terminal of the adjustment resistor is electrically connected to the non-inverting input terminal of the comparator; a first connecting terminal of the first current limiting resistor is electrically connected to the non-inverting input terminal of the comparator, and a second connecting terminal of the first current limiting resistor is configured to receive a circuit supply voltage; and the output terminal of the comparator is configured as a reference signal output terminal of the reference circuit.

In some embodiments, the correction circuit may include a second current limiting resistor, a third current limiting resistor and a logarithm operation circuit; the second current limiting resistor is connected between a reference signal output terminal of the reference circuit and a reference signal input terminal of the logarithm operation circuit; and the third current limiting resistor is connected between an output terminal of the nonlinear displacement signal to be corrected and an input terminal of a signal to be corrected of the logarithm operation circuit.

In some embodiments, a first connecting terminal of the second current limiting resistor is electrically connected to the reference signal output terminal of the reference circuit, a second connecting terminal of the second current limiting resistor is electrically connected to the reference signal input terminal of the logarithm operation circuit; and a first connecting terminal of the third current limiting resistor is configured to receive the nonlinear displacement signal to be corrected, and a second connecting terminal of the third current limiting resistor is electrically connected to the input terminal of the signal to be corrected of the logarithm operation circuit.

In some embodiments, the logarithm operation circuit may include an operational amplifier and a transistor; the logarithm operation circuit is formed by building the operational amplifier and the transistor; or the logarithm operation circuit is a logarithm operation chip.

In some embodiments, the nonlinear displacement signal to be corrected may include an axial displacement signal of the magnetic levitation bearing detected by an eddy current sensor.

In some embodiments, in a case of performing a reference signal matching on the eddy current sensor, the nonlinear displacement signal to be corrected comprises a minimum value of the axial displacement signal output by the eddy current sensor; and an initial value of the reference signal comprises a set minimum reference signal.

According to another aspect of the disclosure, a magnetic levitation bearing system is provided. The system may include the displacement correction apparatus described above.

According to yet another aspect of the disclosure, a displacement correction method of a magnetic levitation bearing system is provided. The method may include: providing a reference signal; and performing, based on the reference signal, a logarithm operation on a nonlinear displacement signal to be corrected, so as to obtain a corrected linear displacement signal.

In some embodiment, the displacement correction method may also include: determining whether the linear displacement signal meets a set threshold, and if the linear displacement signal does not meet the set threshold, outputting an adjustment signal; and adjusting the reference signal based on the adjustment signal, to obtain an adjusted reference signal.

In some embodiment, before determining whether the linear displacement signal meets a set threshold, the displacement correction method may further include: performing an analog-to-digital conversion on the linear displacement signal to obtain a digital signal of the linear displacement signal.

In some embodiment, the nonlinear displacement signal to be corrected may include an axial displacement signal of the magnetic levitation bearing detected by an eddy current sensor.

In some embodiment, in a case of performing a reference signal matching on the eddy current sensor, the nonlinear displacement signal to be corrected comprises a minimum value of the axial displacement signal output by the eddy current sensor; and an initial value of the reference signal comprises a set minimum reference signal.

BRIEF DESCRIPTION OF DRAWINGS

The drawings forming a part of the specification describe embodiments of the disclosure, and are used to explain the principles of the disclosure together with the specification.

Referring to the drawings, the disclosure may be understood more clearly according to the detailed description below.

Figure 1:
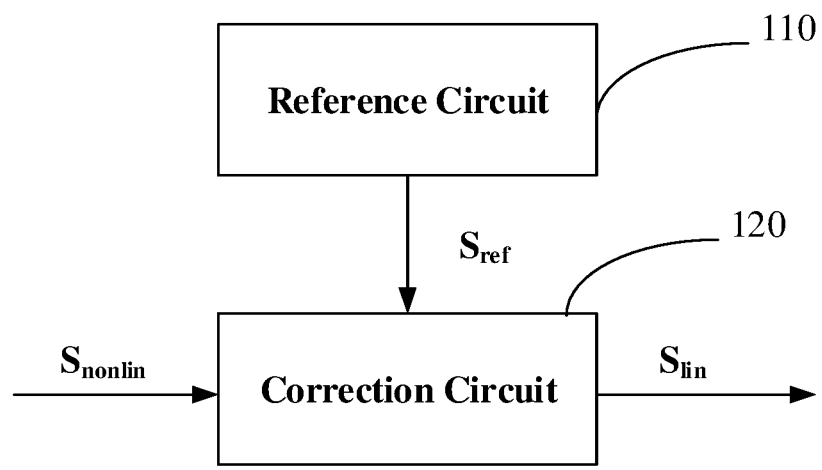
FIG. 1 is a structure schematic diagram illustrating a displacement correction apparatus according to some embodiments of the disclosure.

It should be understood that, the size of each part shown in the drawings do not have to be drawn to actual proportions. In addition, the same or similar reference labels represent the same or similar components.

DETAILED DESCRIPTION OF THE EMBODIMENTS

The various exemplary embodiments of the disclosure are described in detail now with reference to the drawings. The description of the exemplary embodiments is only for an illustration purpose and does not to do any limitation to the disclosure and the application or the use of it. The disclosure may be implemented in many different forms, and not limited to the embodiments described here. The embodiments provided herein are to make the disclosure thorough and complete, and to fully convey the scope of the disclosure to persons having ordinary skill in the art. It should be noted that, unless specified otherwise, the relative arrangement of elements and steps, composition of materials, numerical expression and values described in the embodiments shall be construed as only exemplary and not as limitations.

The terms "first", "second" and similar terms used in the disclosure do not imply any order, number or importance, but are used only to distinguish different parts. The terms "comprise", "include" and similar terms imply that the elements preceding the term include the elements listed after the term, and do not preclude the possibility of including other elements. The terms such as "up", "down", "left" and "right" are only used to represent a relative position relationship, and the relative position relationship may change with the changing of the absolute position of the described object.

In this disclosure, when it is described that a particular device is located between a first device and a second device, an intermediate device may or may not exist between the particular device and the first device or the second device. When it is described that the particular device is electrically connected to other devices, the particular device may be connected to other devices directly without an intermediate device, or may not be electrically connected to other devices directly and having an intermediate device.

All terms used in this disclosure (including technical or scientific terms) have the same meanings as those understood by persons having ordinary skill in the art, unless otherwise specified. It should be also understood that, terms defined, for example, a general purpose dictionary should be explained with a meaning consistent with the meaning in the context of the relevant technology, and should not be explained in an idealized of highly formalized meaning, unless specifically defined here.

The techniques, methods and apparatuses well known to persons having ordinary skill in the art may be not discussed in detail, but the techniques, methods and apparatuses should be considered as a part of the specification, where appropriate.

In the related art, the eddy current sensor may be used to detect the displacement of the shaft of the magnetic levitation bearing system, and since a position detection signal output by the eddy current sensor is not a linear relationship with a displacement signal of the shaft, an accuracy of the position detection of the shaft is poor.

In view of this, the embodiments of this disclosure provide a displacement correction apparatus, to improve the detection accuracy of the shaft.

FIG. 1 is a structure schematic diagram illustrating a displacement correction apparatus according to some embodiments of the disclosure. As shown in FIG. 1, the displacement correction apparatus may include a reference circuit 110 and a correction circuit 120.

The reference circuit 110 may be configured to provide a reference signal $S_{ref}$. For example, the reference circuit 110 may be used to provide a reference signal and to output the reference signal to a reference signal input terminal of the correction circuit 120 (i.e., a first input terminal of the correction circuit 120).

The correction circuit 120 may be configured to perform a logarithm operation on a nonlinear displacement signal $S_{nonlin}$ to be corrected based on the reference signal $S_{ref}$ to obtain a corrected linear displacement signal $S_{lin}$. For example, the correction circuit may be effectively correct the nonlinear displacement signal output by an eddy current sensor to a linear displacement signal.

For example, the nonlinear signal output by the existing eddy current sensor may be corrected into a linear signal by a circuit based on a logarithm operation. The signal relationship processed before and after by the logarithm operation circuit is a logarithm relationship, i.e., y=log (x/a), in which y is an output signal of the circuit, x is an input signal of the circuit, and a is a reference signal.

Therefore, a corrected linear displacement signal may be obtained by, providing a reference signal by a reference circuit, and performing a logarithm operation on a nonlinear displacement signal to be corrected based on the reference signal by a correction circuit, thus realizing a linear correction on the nonlinear displacement signal, so as to improve the detection accuracy of the bearing displacement. Moreover, the above displacement correction apparatus has the advantages of simple structure, good accuracy of correction and high reliability.

Figure 2:
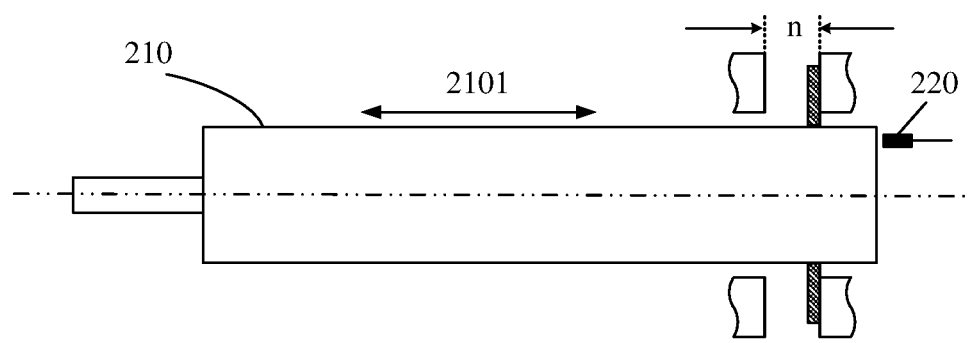
FIG. 2 is a schematic diagram illustrating a detection of an axial sensor for a magnetic levitation bearing system according to some embodiments of the disclosure.

FIG. 2 is a schematic diagram illustrating a detection of an axial sensor for a magnetic levitation bearing system according to some embodiments of the disclosure. As shown in FIG. 2, the shaft 210 in the magnetic levitation bearing system moves along the axis 2101. And the shaft may move along the axis with a distance n, i.e., n is the distance that the shaft moves. Therefore, the minimum effective range required for the eddy current sensor 220 is n.

Figure 3:
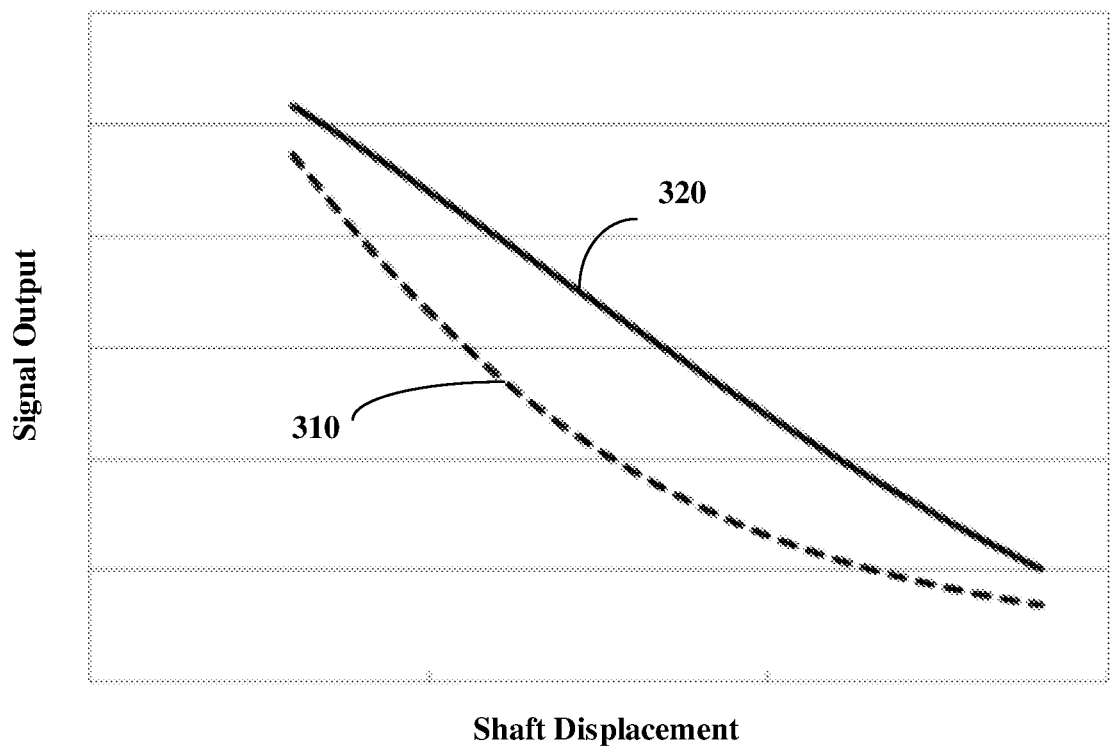
FIG. 3 is a curve diagram illustrating a correction effect of an eddy current sensor for a magnetic levitation bearing system according to some embodiments of the disclosure.

FIG. 3 is a curve diagram illustrating a correction effect of an eddy current sensor for a magnetic levitation bearing system according to some embodiments of the disclosure.

As shown in FIG. 3, a dotted line 310 represents an output signal of the eddy current sensor, i.e., the dotted line 310 represents an output signal of the eddy current sensor before correction, and a solid line 320 represents an output signal of the eddy current sensor after correction. The eddy current sensor has a high accuracy but a short linear range. As can be seen from the dotted line 310, for the detection distance n of the magnetic levitation bearing system, the change rate of the output signal of the eddy current sensor decreases obviously with the increase of the distance. However, the displacement correction apparatus in embodiments of this disclosure may effectively correct the nonlinear displacement signal output by the eddy current sensor into a linear signal, thus improving the detection accuracy of the bearing displacement.

Figure 4:
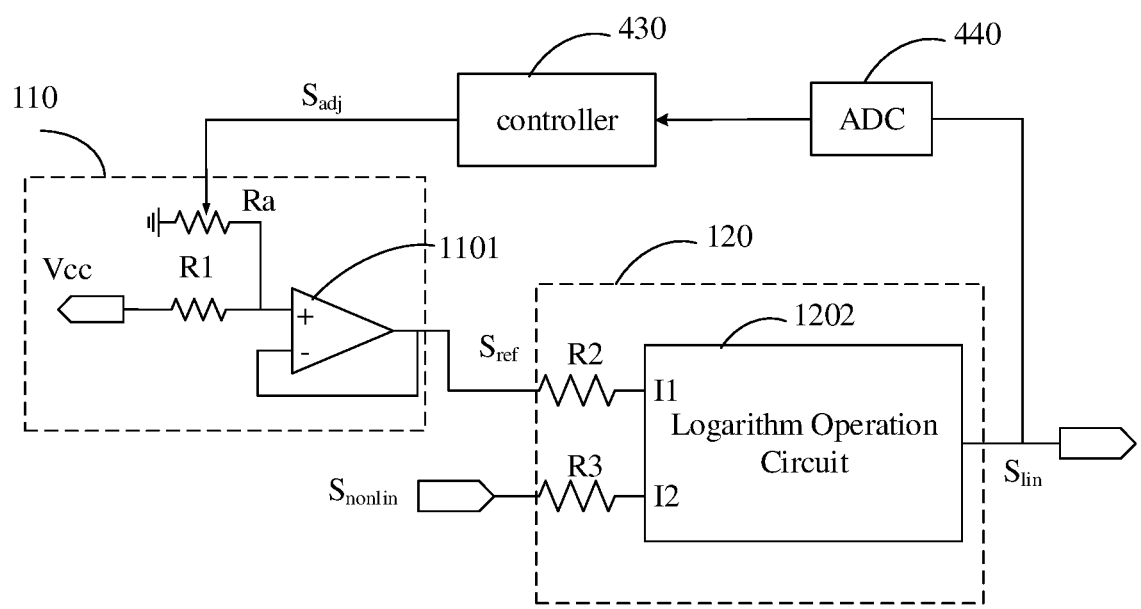
FIG. 4 is a structure schematic diagram illustrating a displacement correction apparatus according to some other embodiments of the disclosure.

FIG. 4 is a structure schematic diagram illustrating a displacement correction apparatus according to some other embodiments of the disclosure. As shown in FIG. 4, the displacement correction apparatus may include the reference circuit 110 and the correction circuit 120. Specifically, the reference circuit may be used to provide a reference signal, and to output the reference signal to a first input terminal of the correction circuit.

For example, as shown in FIG. 4, the reference circuit 110 may be an adjustable reference circuit. For example, the output signal of the reference circuit may be a voltage signal or a current signal. The reference circuit 110 may be used to adjust the reference signal (also called as a base signal). Therefore, the displacement correction apparatus may automatically adjust the reference signal, so that it is suitable for the correction of different sensors (for example, there may be differences between different sensors).

In some embodiments, as shown in FIG. 4, the reference circuit 110 may include: an adjustment resistor Ra, a first current limiting resistor R1, and a comparator 1101. The reference circuit may output an adjustable reference signal (i.e., adjustable reference voltage signal) $S_{ref}$ by the above resistors, operational amplifier and other devices.

Specifically, an adjustment terminal of the adjustment resistor Ra acts as an input terminal of the adjustment signal, and the adjustment resistor Ra is connected to a non-inverting input terminal of the comparator 1101. As shown in FIG. 4, the adjustment terminal of the adjustment resistor Ra is configured to receive an adjustment signal $S_{adj}$. For example, the adjustment terminal of the adjustment resistor Ra is connected to an adjustment signal output terminal of a controller 430 (described later). As shown in FIG. 4, a first connecting terminal of the adjustment resistor Ra is electrically connected to the ground terminal, and a second connecting terminal of the adjustment resistor Ra is electrically connected to the non-inverting input terminal of the comparator 1101.

Specifically, the first current limiting resistor R1 is also connected to the non-inverting input terminal of the comparator 1101. For example, as shown in FIG. 4, a first connecting terminal of the first current limiting resistor R1 is connected to the non-inverting input terminal of the comparator 1101, and a second connecting terminal of the first current limiting resistor R1 is configured to receive a circuit supply voltage Vcc.

An inverting input terminal of the comparator 1101 is connected to an output terminal of the comparator 1101, and the output terminal of the comparator 1101 is connected to a reference signal input terminal of the correction circuit 120 (i.e., a first input terminal of the correction circuit). The output terminal of the comparator 1101 acts as a reference signal output terminal of the reference circuit 110.

Therefore, a reference circuit may be formed by the adjustment resistor, the first limit current resistor and the comparator. The reference circuit has simple structure, and the reference signal is adjustable and flexibility of use is good.

It should be noted that, in addition to the adjustable reference circuit as shown in FIG. 4, the reference circuit may also adopt other forms of reference circuit with a controllable output. For example, the above embodiments disclosed herein are in the form of a circuit with a resistor dividing and an operational amplifier following. Other forms of a circuit with a controllable output, for example, may include programmable signal output chips, DAC converters, or voltage adjustment circuits with adjustable resistors. Therefore, the scope of the embodiments in this disclosure is not limited to these forms of the reference circuit disclosed here.

Specifically, the correction circuit may perform a logarithm operation on the nonlinear displacement signal to be corrected based on the reference signal, to obtain a corrected linear displacement signal.

For example, a linear correction circuit for the eddy current displacement sensor, may effectively correct the nonlinear displacement signal to be corrected output by the eddy current sensor to a linear signal.

For example, the logarithm operation circuit and characteristics thereof may be used to automatically adjust the reference voltage according to the acquired output voltage of the logarithm circuit, so that the correction circuit may be suitable for different outputs of sensors, without changing the hardware circuit, which may effectively increase the circuit applicability.

For example, the nonlinear signal output by the existing eddy current sensor may be corrected into a linear signal by a circuit based on a logarithm operation. The signal relationship processed before and after by the logarithm operation circuit is a logarithm relationship, i.e., y=log (x/a), in which y is an output signal of the circuit, x is an input signal of the circuit, and a is a reference signal.

Therefore, a corrected linear displacement signal may be obtained by, providing a reference signal by a reference circuit, and performing a logarithm operation on a nonlinear displacement signal to be corrected based on the reference signal by a correction circuit, thus realizing a linear correction on the nonlinear displacement signal, and having the advantages of simple structure, good accuracy of correction and high reliability. In an optional embodiment, as shown in FIG. 4, the correction circuit 120 may include a second current limiting resistor R2, a third current limiting resistor R3, and a logarithm operation circuit 1202.

Specifically, the second current limiting resistor R2 is connected between a reference signal output terminal of the reference circuit 110 (for example, the output terminal of the comparator 1101) and a reference signal input terminal of the logarithm operation circuit 1202 (i.e., a first input terminal of the logarithm operation circuit). For example, a first connecting terminal of the second current limiting resistor R2 is electrically connected to the reference signal output terminal of the reference circuit 110, and a second connecting terminal of the second current limiting resistor R2 is electrically connected to the reference signal input terminal of the logarithm operation circuit 1202.

Specifically, the third current limiting resistor R3 is connected between an output terminal of the nonlinear displacement signal to be corrected and an input terminal of a signal to be corrected of the logarithm operation circuit 1202 (i.e., a second input terminal of the logarithm operation circuit). For example, a first connecting terminal of the third current limiting resistor R3 is configured to receive the nonlinear displacement signal $S_{nonlin}$ to be corrected, and a second connecting terminal of the third current limiting resistor R3 is electrically connected to the input terminal of the signal to be corrected of the logarithm operation circuit 1202.

For example, the curve characteristic of the nonlinear signal output by the sensor is similar to the exponential function, so a logarithm operation circuit may be used to perform a logarithm operation on the signal, thus realizing a linear conversion. The logarithm operation circuit (or integrated logarithm operation circuit) may generally contain two input current signals $I_1$ and $I_2$, in which $I_1$ acts as a reference signal and $I_2$ acts as a nonlinear signal to be corrected. The input-output relationship may be represented as: $U_o = A \cdot \log(I_2/I_1)$, in which A acts as a fixed constant. The circuit has a certain limit on the size of the input current signal. Therefore, signal correction can be achieved by processing and matching the input signals $I_1$ and $I_2$. And processing and matching the input signals $I_1$ and $I_2$ to achieve the signal correction may include: according to Ohm's law I=U/R, the size matching of $I_1$ may be adjusted according to the reference signal $S_{ref}$ (in this case, the reference signal $S_{ref}$ is a reference voltage signal $U_{ref}$) and the second current limiting resistor R2, and the size of $I_2$ may be adjusted according to the nonlinear displacement signal $S_{nonlin}$ (in this case, the nonlinear displacement signal $S_{nonlin}$ is a nonlinear voltage input signal Ui) and the third current limiting resistor R3.

For example, since the input signal is a current signal, according to the characteristics of the logarithm operation circuit (or integrated circuit), the voltage may be also converted to a current signal by series resistors or other conversion methods (for example, other conversion methods may be dedicated conversion chips or building dedicated functional circuits). Logarithm operation circuits, series resistors, and other conversion methods are used to convert the voltage signals into current signals. Here, since the logarithm operation circuit includes an operational amplifier, according to the characteristics of "virtual short", "virtual break" of the operational amplifier, the voltage signal may be converted to the current signal by the series resistor. For example, the series resistor method refers to that after inputting the voltage signal into the series resistor, the terminal of the resistor is connected to the input terminal of the operational amplifier, and the inverting terminal of the amplifier is grounded, the voltage signal may be made corresponding to the current signal i=U/R, due to the characteristics such as "virtual short" and "virtual off" of the operational amplifier.

Therefore, the solution of this disclosure may take the voltage signal as an example, and the input-output relationship may be represented as:

$$U_o = A \cdot \log\left(\frac{U_i}{R_2} \bigg/ \frac{U_{ref}}{R_1}\right),$$

in which $U_i$ represents the voltage signal form of the nonlinear displacement signal $S_{nonlin}$, and $U_{ref}$ represents the voltage signal form of the reference signal $S_{ref}$. For a specific eddy current displacement sensor, the range of the input signal Ui of which has been determined, i.e., the range of $I_2$ has been determined. In order to realize the best correction on the signal and to output a reasonable output range of the output signal $U_o$ (i.e., the voltage signal form of the linear displacement signal $S_{lin}$), it is necessary to match an appropriate $U_{ref}$. For example, to make the minimum output of $U_o$ is near 0, the value of $U_{ref}$ needs to be adjusted to make $I_1 \approx$ minimum value of $I_2$, then the minimum output value of $U_o$ is approximately A log 1=0.

The correction of the nonlinear signal and the adjustment of the output signal range of the sensor have been realized above. However, for different bearing systems, since the axial detection distances of the sensors are different, and the output voltage ranges of different eddy current sensors are also different, then the range of the signals to be corrected are different. In order to ensure the effect of linear correction and the range of the corrected signal $U_o$ (i.e., linear displacement signal $S_{lin}$), it is necessary to match and adjust $U_{ref}$ (i.e., reference signal $S_{ref}$) according to different signals to be corrected. For this purpose, the sampling and reading of linear displacement signal $S_{lin}$ and the software control part of reference signal $S_{ref}$ are added in this disclosure.

It should be noted that, in embodiments of this disclosure, the signals to be corrected of the correction circuit is not limited to voltage signals but also applies to current signals. For example, the conversion circuit used for voltage signals may be an existing voltage-current conversion circuit with any forms. For example, the voltage-current conversion circuit may include a dedicated voltage-current signal conversion chip or a building dedicated function circuit.

Thus, the correction circuit may be formed by the second current limiting resistor, the third current limiting resistor and the logarithm operation circuit. The correction circuit may have a simple structure, and be reliable and safe.

In the above embodiments, the reference voltage may be adjusted automatically by using the logarithm operation circuit and its characteristics according to the acquired output voltage of the logarithm circuit, so that the correction circuit may be applicable to different sensor outputs without changing the hardware circuit, which effectively increases the applicability of the circuit.

Alternatively, the logarithm operation circuit 1202 may include an operational amplifier and a transistor. The logarithm circuit may be formed by building the operational amplifier and the transistor; or the logarithm operation circuit may be a logarithm operation chip. For example, the logarithm circuit may be formed by building the operational amplifier and the transistor with techniques known to persons having ordinary skill in the art.

For example, as shown in FIG. 4, the logarithm operation circuit may be an integrated circuit or a self-building circuit to perform logarithm function operation on the signal. And the logarithm operation circuit may adopt circuits or integrated circuits capable that can perform logarithm processing on signals. For example, a logarithm circuit built by adopting an operational amplifier and a transistor, or a logarithm operation chip made by chip manufacturers such as ADL5303 chip.

Therefore, the flexibility and convenience of logarithm operation may be improved by using various forms of logarithm operation circuits to realize logarithm operation.

Alternatively, the nonlinear displacement signal to be corrected may include the axial displacement signal of the magnetic levitation bearing (shaft 210, as shown in FIG. 2) detected by the eddy current sensor (eddy current sensor 220, as shown in FIG. 2).

For example, a linear correction circuit of the eddy current displacement sensor is used to correct the output signal of the sensor into a linear signal, which improves the linear range and the detection accuracy of the position signal. The circuit may meet the correction needs of different ranges of sensors and avoid changing the hardware circuit. As shown in FIG. 4, the nonlinear signal $S_{nonlin}$ of the eddy current sensor is input to the correction circuit, and a linear signal (for example, solid line 320 shown in FIG. 3) is output finally. In this way, the linear range of the eddy current sensor used in magnetic levitation bearing system may be increased, and the reliability of the system may be improved, thus the circuit applicability is wide.

Therefore, the accurate detection of the bearing displacement in the magnetic levitation bearing system may be realized by correcting the nonlinear displacement signal detected by the eddy current sensor, thus improving the levitation reliability and accuracy.

In some embodiments, in a case of performing a reference signal matching on the eddy current sensor, the nonlinear displacement signal to be corrected may include a minimum value of the axial displacement signal output by the eddy current sensor. And an initial value of the reference signal may include a set minimum reference signal. For example, the reference voltage may be automatically adjusted by software control to match different output requirements of linear correction, and the output range of the signal may be adjusted. Therefore, the minimum value of the axial displacement output by the eddy current sensor may be corrected preliminarily based on the set minimum reference signal, thus realizing the matching of the reference signal of the eddy current sensor, which is reliable and safe.

In an alternative embodiment, as shown in FIG. 4, the displacement correction apparatus may also include a controller 430. Specifically, the controller 430 may be disposed between the correction circuit 120 and the reference circuit 110. The controller 430 may be used to determine whether the linear displacement signal $S_{lin}$ meets the set threshold. If the linear displacement signal does not meet the set threshold, the adjustment signal $S_{adj}$ will be output to the reference circuit 110. For example, in order to adjust the value of the initial value of the corrected signal, a small range of threshold value may be set, and if the initial value is not within the range of the threshold value, the threshold requirement is not met. For example, the minimum threshold value is set as 0, then the threshold requirement is not met when the linear displacement signal Sin is less than 0, at this time, the controller 430 will output the adjustment signal $S_{adj}$ to adjust and change the output value of $S_{lin}$. Here, the set threshold may be set according to the signal acquisition range of controller 430 and the data processing needs of the whole system. For example, if the output range of the corrected signal is 1~3, then the initial value of the signal is 1, and the threshold may be set near 1, such as, 1~1.1, etc.

Specifically, in the process of use, the controller 430 may also be used in the operation of determining whether the linear displacement signal $S_{lin}$ meets the set threshold. If the linear displacement signal meets the set threshold, the matching setting of the measurement subject (such as eddy current sensor) of the nonlinear displacement signal to be corrected may be completed. For example, the controller 430 may be an MCU (Microcontroller Unit). For example, the MCU may be a master control chip.

Specifically, the reference circuit 110 may be used to adjust the reference signal based on the adjustment signal $S_{adj}$ to obtain an adjusted reference signal. Furthermore, the correction circuit 120 may be used to perform a logarithm operation on the nonlinear displacement signal to be corrected again, based on the adjusted reference signal, to obtain a corrected linear displacement signal again.

For example, the nonlinear signal output by the eddy current sensor may be corrected to a linear signal by a circuit based on logarithm operation; at the same time, the reference voltage may be automatically adjusted by software control, so that the reference voltage may match different output requirements of linear corrections, the output range of the signal may be adjustable, and the circuit may meet different correction requirements of sensor ranges, which avoid changing the hardware circuit, and increase the applicability of the circuit.

Thus, when it is determined that the linear displacement signal output by the correction circuit does not meet the set threshold, by adjusting the reference signal with the reference circuit, a correction of the nonlinear displacement signal based on the adjusted reference signal may be performed again, thus the reference signal of the eddy current sensor may be matched, which is conducive to improve the matching precision and reliability.

In an alternative embodiment, as shown in FIG. 4, the displacement correction apparatus may also include an Analog-to-Digital Converter (ADC) 440. Specifically, the analog-to-digital converter 440 may be disposed between the correction circuit 120 and the controller 430. The analog-to-digital converter 440 may be used to perform an analog-to-digital conversion on the linear displacement signal $S_{lin}$ to obtain a digital signal of the linear displacement signal, and then output the digital signal of the linear displacement signal to the controller 430. In this way, the controller can determine whether the linear displacement signal after analog-to-digital conversion meets the set threshold.

For example, the analog-to-digital converter 440 may be used as a signal acquisition module for acquiring the output signal (i.e., linear displacement signal $S_{lin}$).

Therefore, by performing the analog-to-digital conversion on the corrected linear displacement signal, and then determining whether the linear displacement signal after analog-to-digital conversion meets the preset threshold, the accuracy and convenience of the judgment can be improved.

A large number of tests have verified that the technical solution of this disclosure may effectively correct the nonlinear displacement signal output by the eddy current displacement sensor into a linear signal by the linear correction circuit of the eddy current displacement sensor, so as to improve the detection accuracy of bearing displacement.

The embodiments of this disclosure also provide a magnetic levitation bearing system. The magnetic levitation bearing system may include a displacement correction apparatus described above.

In an alternative embodiment, the solution of this disclosure provides a linear correction circuit for an eddy current displacement sensor, which may be applied to a magnetic levitation bearing system of a variable frequency centrifugal chiller.

Alternatively, in the solution of this disclosure, the linear correction circuit for an eddy current displacement sensor can effectively correct the nonlinear displacement signal output by the eddy current sensor into a linear signal.

Specifically, the logarithm operation circuit and characteristics thereof may be used to automatically adjust the reference voltage according to the output voltage of the logarithm circuit acquired, so that the correction circuit may be suitable for different outputs of sensors, without changing the hardware circuit, which effectively increases the circuit applicability.

Wherein the signal relationship processed before and after by the logarithm operation circuit is a logarithm relationship, i.e., y=log (x/a), in which y is an output signal of the circuit, x is an input signal of the circuit, and a is a reference signal. The input-output relationship of the signal shows a logarithm curve, which is similar to the curve of attenuation of the sensor signal.

In an alternative embodiment, the solution of this disclosure may correct the nonlinear signal output by the existing eddy current sensor into a linear signal by a circuit based on logarithm operation; at the same time, the reference voltage may be automatically adjusted by software control, so that the reference voltage may match different output requirements of linear corrections, the output signal range may be adjustable.

That is to say, the solution of this disclosure provides a displacement correction apparatus, and the displacement correction apparatus acts as a linear correction circuit of the eddy current sensor, which may correct the nonlinear signal output by the eddy current sensor into a linear signal by a circuit based on logarithm operation; at the same time, the reference voltage may be automatically adjusted by software control, so that the reference voltage may match different output requirements of linear corrections, the output signal range may be adjustable, and the circuit may meet correction requirements of different sensor ranges, which avoid changing the hardware circuit, and increase the applicability of the circuit.

It can be seen that the solution of this disclosure, the output of sensor may be corrected into a linear signal by using the linear correction circuit of the eddy current displacement sensor, which may improve the linear range and the detection accuracy of position signal; and the circuit may meet the correction requirements of different sensor ranges and avoid changing the hardware circuit. In this way, the linear range of eddy current sensor in magnetic levitation bearing system is increased, the reliability of the system is improved, and the circuit applicability is wide. In an alternative detailed embodiment, an exemplary illustration of the detailed implement process of the solution in this disclosure may be described by referring to the examples shown in FIG. 2-5. In the magnetic levitation bearing system, the axial movement of the shaft is shown in FIG. 2, and the axial movable distance is n, that is, n represents the distance that the shaft may move, so the minimum effective range required by the eddy current sensor is n. The eddy current sensor has a higher accuracy but a smaller linear range. For the detection distance n of the magnetic levitation bearing system, the change rate of the output signal of the sensor decreases obviously with the increase of the distance. As shown in FIG. 3, the dotted line 310 represents the output signal of the eddy current sensor, i.e., the dotted line 310 represents the output signal of the eddy current sensor before correction, and the solid line 320 represents the output signal of the eddy current sensor after correction.

In an alternative detailed embodiment, the displacement correction apparatus disclosed in this disclosure may be shown in FIG. 4. In FIG. 4, the displacement correction apparatus may include an adjustable reference circuit, a logarithm operation circuit, an MCU acquisition and control part. The nonlinear signal of the eddy current sensor is input to the displacement correction apparatus, and a linear signal (for example, solid line 320 shown in FIG. 3) is output finally.

As for the correction circuit shown in FIG. 4, at present, there is no technology to correct eddy current sensor signals by using logarithm operation circuit. In addition to the logarithm circuit, an adjustable reference circuit is added in the solution of this disclosure to adjust the reference signal, and the adjustable reference circuit may automatically adjust the reference signal, so as to be suitable for the correction of different sensors (each sensor may be different).

Figure 5:
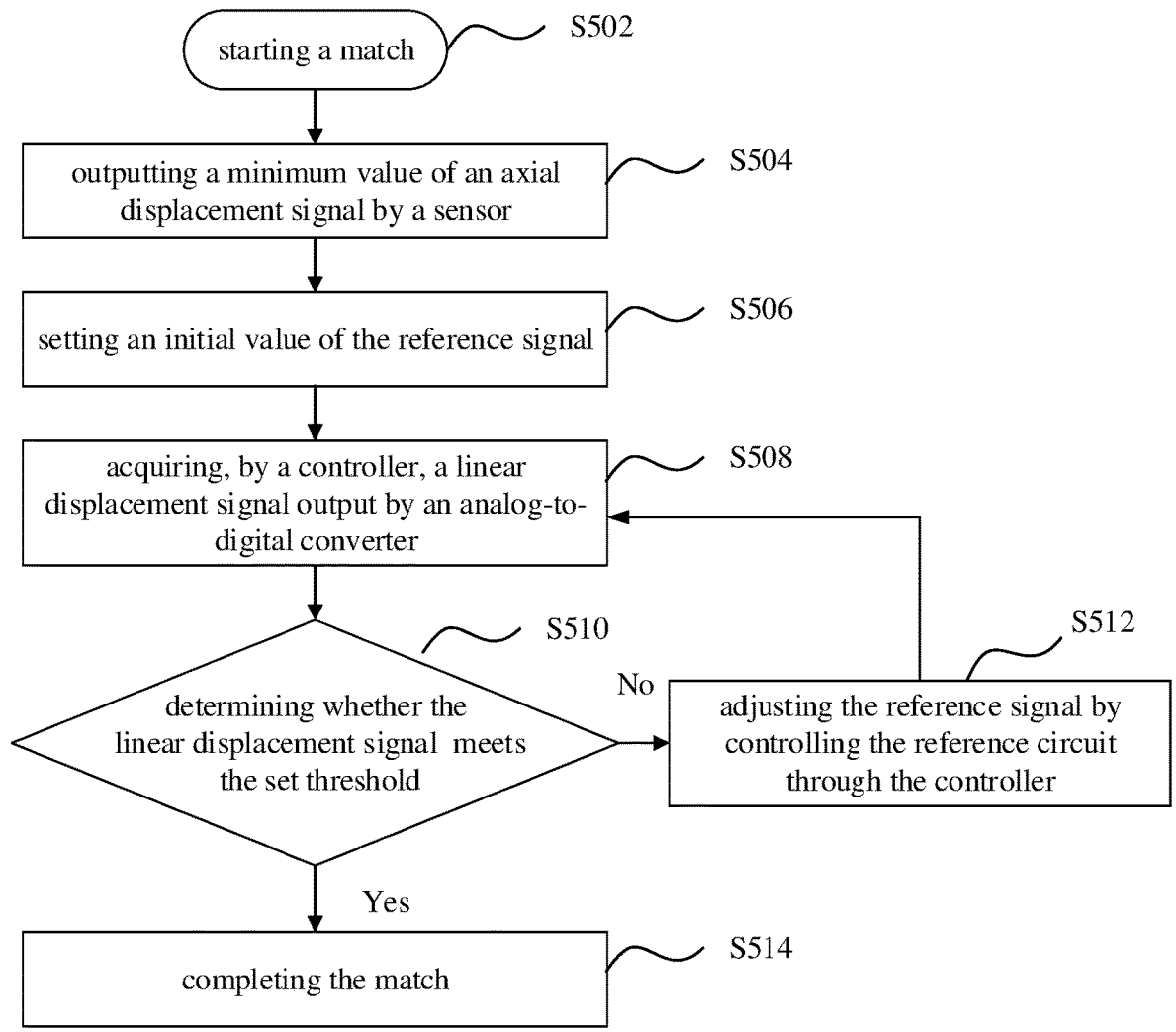
FIG. 5 is a flow schematic diagram illustrating a sensor matching method for a magnetic levitation bearing system according to some embodiments of the disclosure.

FIG. 5 is a flow schematic diagram illustrating a sensor matching method for a magnetic levitation bearing system according to some embodiments of the disclosure. As shown in FIG. 5, the matching method may include step S502 to S514.

In step S502, starting a match.

In step S504, outputting a minimum value of an axial displacement signal by a sensor. That is, making the axial displacement signal Ui (i.e., the nonlinear displacement signal $S_{nonlin}$) output by the sensor is the minimum value.

In step S506, setting an initial value of the reference signal. For example, the MCU may control the initial value of a given reference signal, $U_{ref}$ (i.e., $S_{ref}$) be 1V.

In step S508, acquiring, by a controller, a linear displacement signal $S_{lin}$ output by an analog-to-digital converter. That is, the MCU acquires and reads the output value $U_o$ of the correction circuit by ADC signal.

In step S510, determining whether the linear displacement signal $S_{lin}$ meets the set threshold. If not, the process continues to step S512; else the process continues to step S514.

In step S512, adjusting the reference signal by controlling the reference circuit through the controller. For example, the controller controls the reference circuit to adjust the reference signal according to the desired output range of the linear displacement signal, until the desired linear displacement signal is obtained.

In step S514, completing the match.

In the above embodiments, the above method achieves (such as using software) the purpose of automatically matching the displacement correction apparatus with the sensor. This method can avoid changing the hardware circuit as much as possible and improve the applicability of the correction circuit.

Taking signals $S_{nonlin}$, $S_{lin}$ and $S_{ref}$ as voltage signals for example, the sensor signal Ui (i.e., the nonlinear displacement signal $S_{nonlin}$) may be set as the minimum value firstly, and the MCU may control to give the initial value $U_{ref}$ (i.e., the reference signal $S_{ref}$, such as, 1V), and then the MCU may acquire and read the value $U_o$ (i.e., the linear displacement signal $S_{lin}$) through an ADC signal to judge whether the output of $U_o$ meets the requirements. If not, controlling the adjustable reference circuit to adjust $U_{ref}$ according to the required output range of $U_o$, until the desired $U_o$ is obtained, so as to realize automatic matching sensor by software, thus avoiding changing the hardware circuit, and improving the applicability of the correction circuit. In an alternative detailed embodiment, in the solution disclosed, the reference circuit is preferred to be an adjustable reference circuit, which may be any existing controllable output reference circuit with any forms, and the output of the reference circuit may be a voltage signal or a current signal.

For example, the solution disclosed herein is taking a circuit with a resistor dividing and an operational amplifier following as an example. Other forms of a circuit with a controllable output, for example, may include programmable signal output chips, DAC converters, or voltage adjustment circuits with adjustable resistors.

In an alternative detailed embodiment, in the solution of this disclosure, the signal to be corrected of the linear correction circuit is not limited to voltage signals but also applies to current signals. The conversion of the voltage signals may be an existing voltage-current conversion circuit with any forms.

For example, other conversion forms such as a dedicated voltage-current signal conversion chip, or a building dedicated function circuit.

Since the processing and functions realized by the magnetic levitation bearing system in this embodiment are basically corresponding to the embodiment, principle and example of the apparatus shown in FIG. 1 above, the details not included in the description of this embodiment may be referred to the relevant description in the afore-mentioned embodiments and will not be repeated here.

A large number of tests have verified that adopting the technical solution of this disclosure, the reference voltage may be adjusted automatically by using the logarithm operation circuit according to the acquired output voltage of the logarithm circuit, so that the correction circuit may be applicable to different sensor outputs, and the applicability of the circuit is effectively increased without changing the hardware circuit, thus improving the stability and reliability of the magnetic levitation.

Figure 6:
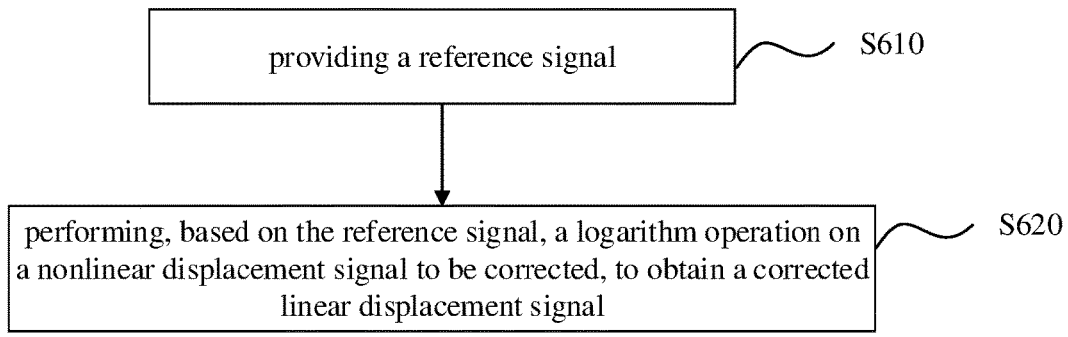
FIG. 6 is a flow diagram illustrating a displacement correction method of a magnetic levitation bearing system according to some embodiments of the disclosure.

According to the embodiments of this disclosure, a displacement correction method for a magnetic levitation system is provided. FIG. 6 is a flow diagram illustrating a displacement correction method of a magnetic levitation bearing system according to some embodiments of the disclosure. The displacement correction method for a magnetic levitation system may include step S610 and step S620.

In step S610, providing a reference signal. For example, a reference circuit may output the reference signal to a first input terminal of a correction circuit.

For example, as shown in FIG. 4, the reference circuit may be an adjustable reference circuit used to adjust the reference signal, and the circuit may automatically adjust the reference signal, thus being suitable for correction of different sensors (each sensor may be different).

In step S620, performing, based on the reference signal, a logarithm operation on a nonlinear displacement signal to be corrected, to obtain a corrected linear displacement signal.

For example, a linear correction circuit for an eddy current displacement sensor may effectively correct the nonlinear displacement signal output by the eddy current sensor into a linear signal.

For example, the reference voltage may be adjusted automatically by using the logarithm operation circuit and its characteristics according to the acquired output voltage of the logarithm circuit, so that the correction circuit may be applicable to different sensor outputs, and the applicability of the circuit is effectively increased without changing the hardware circuit.

For example, the nonlinear signal output by the existing eddy current sensor may be corrected into a linear signal by a circuit based on a logarithm operation. The signal relationship processed before and after by the logarithm operation circuit is a logarithm relationship, i.e., $y=\log(x/a)$, in which y is an output signal of the circuit, x is an input signal of the circuit, and a is a reference signal.

Therefore, a corrected linear displacement signal may be obtained by, providing a reference signal by a reference circuit, and performing a logarithm operation on a nonlinear displacement signal to be corrected based on the reference signal by a correction circuit, thus realizing a linear correction of the nonlinear displacement signal. Moreover, the displacement correction apparatus has the advantages of simple structure, good accuracy of correction and high reliability.

Alternatively, the nonlinear displacement signal to be corrected may include the axial displacement signal of the magnetic levitation bearing (shaft 210, as shown in FIG. 2) detected by the eddy current sensor (eddy current sensor 220, as shown in FIG. 2).

For example, a linear correction circuit of the eddy current displacement sensor is used to correct the output signal of the sensor into a linear signal, which improves the linear range and the accuracy of detection on the position signal. The circuit may meet the correction needs of different ranges of sensors and avoid changing the hardware circuit. As shown in FIG. 4, the nonlinear signal $S_{nonlin}$ of the eddy current sensor is input to the correction circuit, and a linear signal (for example, solid line 320 shown in FIG. 3) is output finally. In this way, the linear range of the eddy current sensor used in magnetic levitation bearing system may be increased, and the reliability of the system may be improved, thus the circuit applicability is wide.

Therefore, the accurate detection of bearing displacement in the magnetic levitation bearing system may be realized by correcting the nonlinear displacement signal detected by the eddy current sensor, thus improving the levitation reliability and accuracy.

In some embodiments, in a case of performing a reference signal matching on the eddy current sensor, the nonlinear displacement signal to be corrected may include a minimum value of the axial displacement signal output by the eddy current sensor. And an initial value of the reference signal may include a set minimum reference signal.

For example, the reference voltage may be automatically adjusted by software control to match different output requirements of linear correction, and the output range of the signal may be adjusted.

Therefore, the minimum value of the axial displacement output by the eddy current sensor may be corrected preliminarily based on the set minimum reference signal, thus realizing the matching of the reference signal of the eddy current sensor, which is reliable and safe.

In an alternative embodiment, the above displacement correction method may also include a process for matching the reference signal. For example, the above displacement correction method may also include: determining whether the linear displacement signal meets a set threshold, and if the linear displacement signal does not meet the set threshold, outputting an adjustment signal; and adjusting the reference signal based on the adjustment signal, to obtain an adjusted reference signal.

Figure 7:
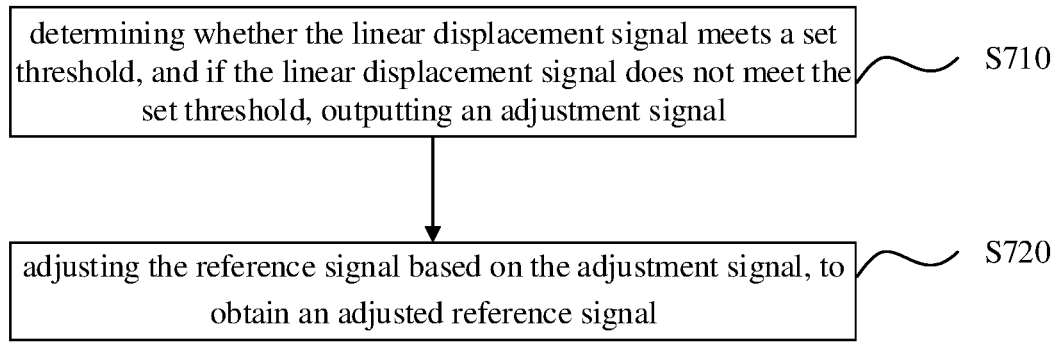
FIG. 7 is a flow diagram illustrating a method for matching a reference signal according to some embodiments of the disclosure.

FIG. 7 is a flow diagram illustrating a method for matching a reference signal according to some embodiments of the disclosure.

The specific process of matching the reference signal is further explained below in combination with the FIG. 7, which is a flow diagram illustrating a method for matching a reference signal according to an embodiment. The method used to match the reference signal may include steps S710 and S720.

Step S710, determining whether the linear displacement signal meets a set threshold, and if the linear displacement signal does not meet the set threshold, outputting an adjustment signal. Specifically, in the process of use, the controller may also be used in the operation on determining whether the linear displacement signal $S_{lin}$ meets the preset threshold. If the linear displacement signal meets the preset threshold, the matching setting of the measurement subject, such as an eddy current sensor, of the nonlinear displacement signal to be corrected may be completed.

Step S720, adjusting the reference signal based on the adjustment signal, to obtain an adjusted reference signal. Furthermore, the correction circuit may be used to perform a logarithm operation on the nonlinear displacement signal to be corrected again based on the adjusted reference signal to obtain a corrected linear displacement signal again.

For example, the nonlinear signal output by the eddy current sensor may be corrected to a linear signal by a circuit based on logarithm operation; at the same time, the reference voltage may be automatically adjusted by software control, so that the reference voltage may match different output requirements of linear corrections, the output signal range may be adjustable, and the circuit may meet different correction requirements of sensor ranges, which avoid changing the hardware circuit, and increase the applicability of the circuit.

Thus, in a case that the linear displacement signal output by the correction circuit is determined not to meet the preset threshold, by adjusting the reference signal with the reference circuit, a correction of the nonlinear displacement signal based on the adjusted reference signal may be performed again, thus the reference signal of the eddy current sensor may be matched, which is conducive to improve the matching precision and reliability.

In some embodiments, before determining whether the linear displacement signal meets a set threshold, the displacement correction method may further include performing an analog-to-digital conversion on the linear displacement signal to obtain a digital signal of the linear displacement signal. For example, a digital signal of the linear displacement signal may be obtained after preforming an analog-to-digital to the linear displacement signal, then outputting the digital signal of the linear displacement signal to determine whether the linear displacement signal after the analog-to-digital conversion meets a set threshold.

For example, as shown in FIG. 4, ADC is an analog-to-digital converter, which acquires the final output signal.

Therefore, the accuracy and convenience of the judgment may be improved by determining whether the linear displacement signal after analog-to-digital conversion meets the preset threshold, in which the linear displacement signal has been corrected before performing the analog-to-digital conversion.

Since the processing and functions realized by the method in this embodiment are basically corresponding to the embodiment, principle and example of the apparatus shown in FIG. 2 to FIG. 5 above, the details not included in the description of this embodiment may be referred to the relevant description in the afore-mentioned embodiments and will not be repeated here.

A large number of tests have verified that, adopting the technical solution of this disclosure, the nonlinear signal output by the existing eddy current sensor may be corrected to a linear signal by a circuit based on logarithm operation; at the same time, the reference voltage may be automatically adjusted by software control, so that the reference voltage may match different output requirements of linear corrections, and the output signal range may be adjustable, which may widen the application range and improve the reliability.

Overall, it should be understood for persons having ordinary skill in the art, the advantageous methods above may be freely combined and superimposed under the premise of no conflict.

The descriptions above are only preferred embodiments of the disclosure and are not used to limit the disclosure. It will be apparent to persons having ordinary skill in the art that various modifications and variations may be made in the disclosure. Any modification, equivalent substitution or improvement, etc. within the spirit and principle of the present invention shall be included in the scope of claims of the disclosure.

What is claimed is:

1. A displacement correction apparatus, comprising:
   a reference circuit, configured to provide a reference signal; and
   a correction circuit, configured to perform a logarithm operation on a nonlinear displacement signal to be corrected, based on the reference signal, to obtain a corrected linear displacement signal,
   wherein the nonlinear displacement signal to be corrected comprises an axial displacement signal of a magnetic levitation bearing detected by an eddy current sensor,
   wherein in a case of performing a reference signal matching on the eddy current sensor,
   the nonlinear displacement signal to be corrected comprises a minimum value of the axial displacement signal output by the eddy current sensor; and
   an initial value of the reference signal comprises a set minimum reference signal.

2. The displacement correction apparatus according to claim 1, further comprising:
   a controller, configured to determine whether the linear displacement signal meets a set threshold, and if the linear displacement signal does not meet the set threshold, output an adjustment signal to the reference circuit, wherein the reference circuit is configured to adjust the reference signal, based on the adjustment signal, to obtain an adjusted reference signal.

3. The displacement correction apparatus according to claim 2, further comprising:
an analog-to-digital converter, configured to perform an analog-to-digital conversion on the linear displacement signal to obtain a digital signal of the linear displacement signal, and output the digital signal of the linear displacement signal to the controller.

4. The displacement correction apparatus according to claim 1, wherein the reference circuit comprises an adjustment resistor, a first current limiting resistor, and a comparator, wherein,
an adjustment terminal of the adjustment resistor is an input terminal of the adjustment signal, the adjustment resistor is connected to a non-inverting input terminal of the comparator; and
the first current limiting resistor is also connected to the non-inverting input terminal of the comparator, an inverting input terminal of the comparator is connected to an output terminal of the comparator, and the output terminal of the comparator is connected to a reference signal input terminal of the correction circuit.

5. The displacement correction apparatus according to claim 4, wherein,
the adjustment terminal of the adjustment resistor is configured to receive the adjustment signal, a first connecting terminal of the adjustment resistor is electrically connected to a ground terminal, and a second connecting terminal of the adjustment resistor is electrically connected to the non-inverting input terminal of the comparator;
a first connecting terminal of the first current limiting resistor is electrically connected to the non-inverting input terminal of the comparator, and a second connecting terminal of the first current limiting resistor is configured to receive a circuit supply voltage; and
the output terminal of the comparator is configured as a reference signal output terminal of the reference circuit.

6. The displacement correction apparatus according to claim 1, wherein the correction circuit comprises: a second current limiting resistor, a third current limiting resistor and a logarithm operation circuit, wherein,
the second current limiting resistor is connected between a reference signal output terminal of the reference circuit and a reference signal input terminal of the logarithm operation circuit; and
the third current limiting resistor is connected between an output terminal of the nonlinear displacement signal to be corrected and an input terminal of a signal to be corrected of the logarithm operation circuit.

7. The displacement correction apparatus according to claim 6, wherein,
a first connecting terminal of the second current limiting resistor is electrically connected to the reference signal output terminal of the reference circuit, a second connecting terminal of the second current limiting resistor is electrically connected to the reference signal input terminal of the logarithm operation circuit; and
a first connecting terminal of the third current limiting resistor is configured to receive the nonlinear displacement signal to be corrected, and a second connecting terminal of the third current limiting resistor is electrically connected to the input terminal of the signal to be corrected of the logarithm operation circuit.

8. The displacement correction apparatus according to claim 6, wherein,
the logarithm operation circuit comprises: an operational amplifier and a transistor; wherein the logarithm operation circuit is formed by building the operational amplifier and the transistor; or
the logarithm operation circuit is a logarithm operation chip.

9. A magnetic levitation bearing system, comprising the displacement correction apparatus according to claim 1.

10. A displacement correction method for a magnetic levitation bearing system, comprising:
providing a reference signal; and
performing, based on the reference signal, a logarithm operation on a nonlinear displacement signal to be corrected, to obtain a corrected linear displacement signal,
wherein the nonlinear displacement signal to be corrected comprises an axial displacement signal of the magnetic levitation bearing detected by an eddy current sensor,
wherein in a case of performing a reference signal matching on the eddy current sensor,
the nonlinear displacement signal to be corrected comprises a minimum value of the axial displacement signal output by the eddy current sensor; and
an initial value of the reference signal comprises a set minimum reference signal.

11. The displacement correction method according to claim 10, further comprising:
determining whether the linear displacement signal meets a set threshold, and if the linear displacement signal does not meet the set threshold, outputting an adjustment signal; and
adjusting the reference signal based on the adjustment signal, to obtain an adjusted reference signal.

12. The displacement correction method according to claim 11, wherein, before the determining whether the linear displacement signal meets a set threshold, the displacement correction method further comprises:
performing an analog-to-digital conversion on the linear displacement signal to obtain a digital signal of the linear displacement signal.

* * * * *